(12) United States Patent
Zabih et al.

(10) Patent No.: US 6,226,407 B1
(45) Date of Patent: May 1, 2001

(54) METHOD AND APPARATUS FOR ANALYZING COMPUTER SCREENS

(75) Inventors: Ramin Zabih, Itaca, NY (US); Ramin Halviatti, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/044,209

(22) Filed: Mar. 18, 1998

(51) Int. Cl.[7] ............... G06K 9/62; G06K 9/68; G06F 15/00

(52) U.S. Cl. ............... 382/209; 382/218; 382/219; 707/516

(58) Field of Search ............... 382/154, 209, 382/218, 219, 305, 309, 180; 707/513, 516

(56) References Cited

U.S. PATENT DOCUMENTS

| | | | |
|---|---|---|---|
| 5,040,227 | * 8/1991 | Lyke et al. | 382/138 |
| 5,121,441 | * 6/1992 | Chefalas et al. | 382/189 |
| 5,146,512 | * 9/1992 | Weideman et al. | 382/218 |
| 5,235,652 | * 8/1993 | Nally | 382/218 |
| 5,251,265 | * 10/1993 | Dohle et al | 382/218 |
| 5,367,674 | * 11/1994 | Berk et al. | 708/203 |
| 5,602,937 | * 2/1997 | Bedrosian et al. | 382/218 |
| 5,689,585 | * 11/1997 | Bloomberg et al. | 382/229 |
| 5,764,871 | * 6/1998 | Fogel | 382/154 |
| 5,838,318 | * 11/1998 | Porter et al. | 345/342 |
| 5,859,923 | * 1/1999 | Petry, III et al. | 382/218 |
| 5,907,641 | * 5/1999 | Corvi et al. | 382/209 |
| 5,943,064 | * 8/1999 | Hong | 345/502 |
| 5,986,670 | * 11/1999 | Dries et al. | 345/435 |
| 6,012,083 | * 1/2000 | Savitzky et al. | 709/202 |
| 6,061,696 | * 5/2000 | Lee et al. | 707/513 |

* cited by examiner

Primary Examiner—Leo Boudreau
Assistant Examiner—Daniel G. Mariam
(74) Attorney, Agent, or Firm—Leydig, Voit & Mayer Ltd.

(57) ABSTRACT

An invention for quantitatively analyzing bitmap images using computer vision is disclosed. In one embodiment, these bitmap images correspond to the rendered screens of two applications based on a same data source file. An optional preprocessing step filters non-important information for analyzing purposes such as the background, replaces each image with a blank image of the same size, and modifies non-visible attributes of a screen so their structure can be recovered during the computer vision processing. After a series of rendered screens of each application are captured, these bitmap images are interpreted using computer vision techniques to produce machine-readable visual attributes of the rendered screens. Corresponding attributes from each of the two applications are then compared to generate a set of differences, where those differences within a predefined set of deliberate design differences are ignored. These attributes and differences are then processed to derive a set of grades reflecting the similarities between the rendered screens of the two applications. In determining these grades, a set of user-definable thresholds are used to overlook small variances inherent in the rendering by the different applications.

31 Claims, 12 Drawing Sheets

DUAL APPLICATION FRAMEWORK

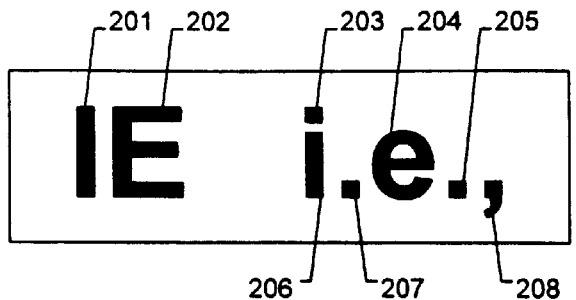
FIG. 2A – MARKS
```
211 ──The quick brown fox jumped over the lazy dog.
212 ──Now is the time for all good men to come to the
213 ──aid of their country.
```
FIG. 2B – LINES
| Name | Sales | Sales Area |
|---|---|---|
| Joe Johnson | $100 | Northwest Territory |
| Steve Smith | $200 | South Territory |
FIG. 2C – BOXES

FIG. 2D – BITMAP
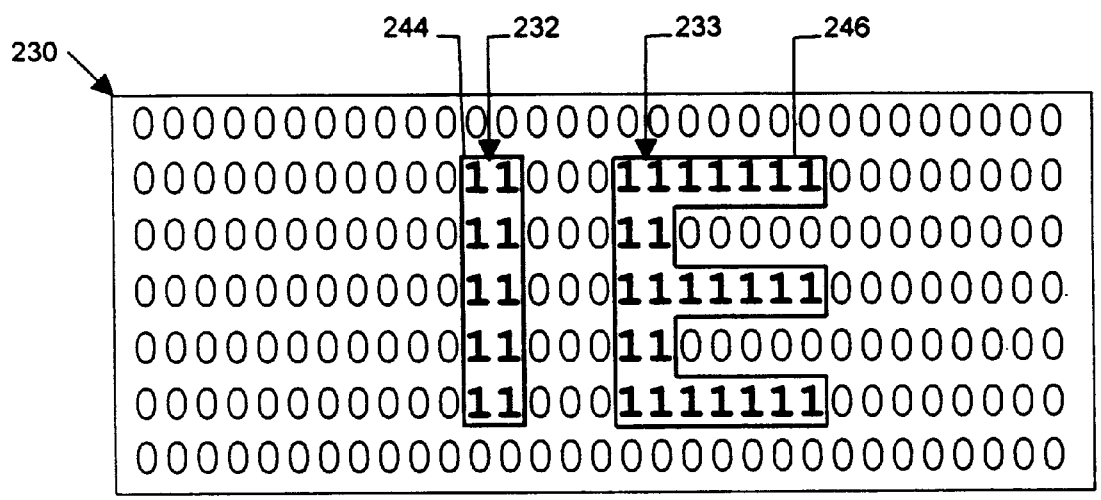
FIG. 2E – RECOVERY OF MARKS

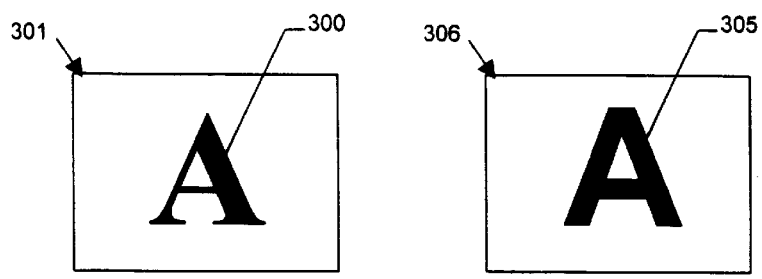
FIG. 3A – RENDERING
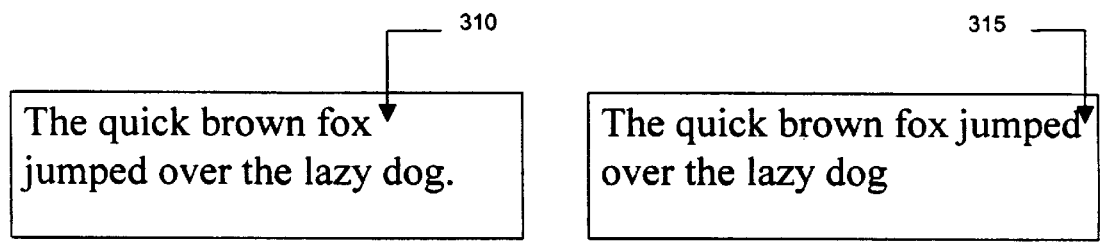
FIG. 3B – LINE BREAKS
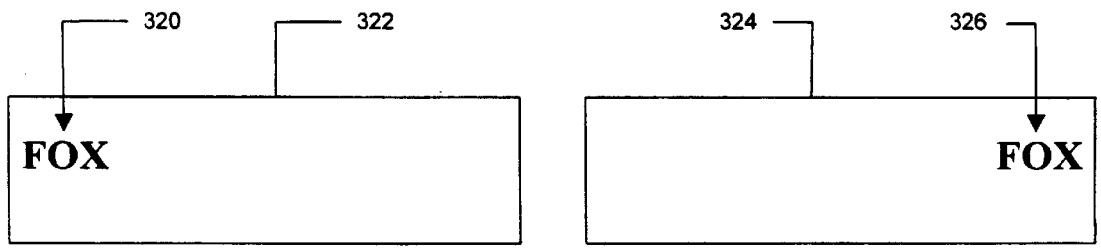
FIG. 3C - ALIGNMENT

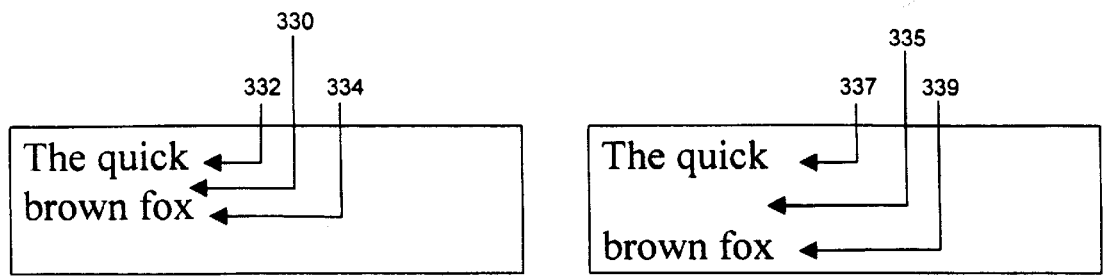
FIG. 3D - SPACING
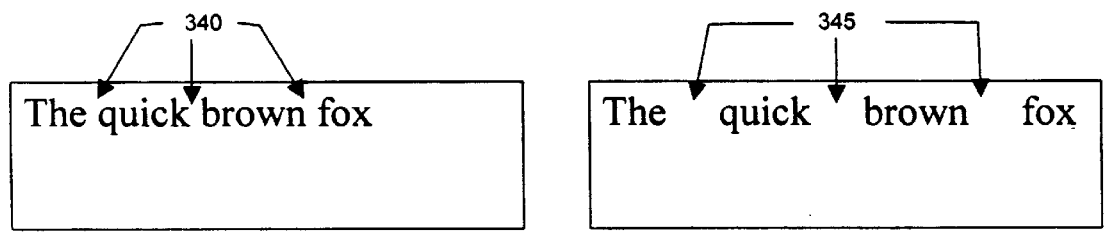
FIG. 3E – PLACEMENT
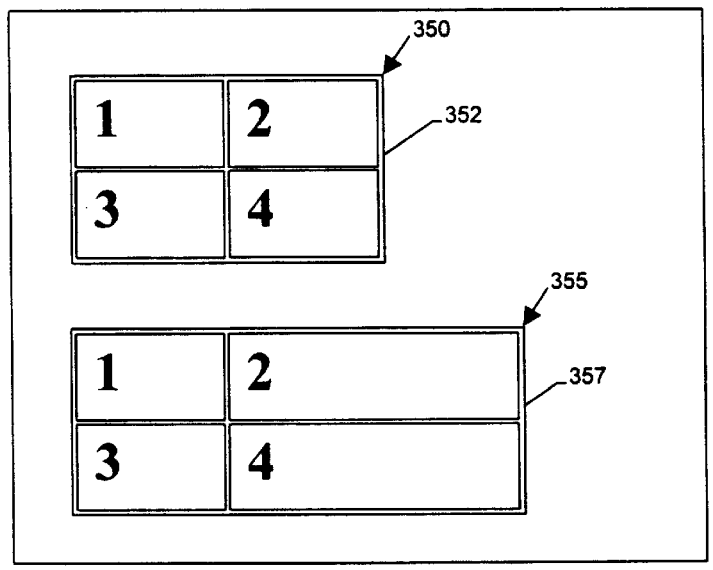
FIG. 3F - SIZE

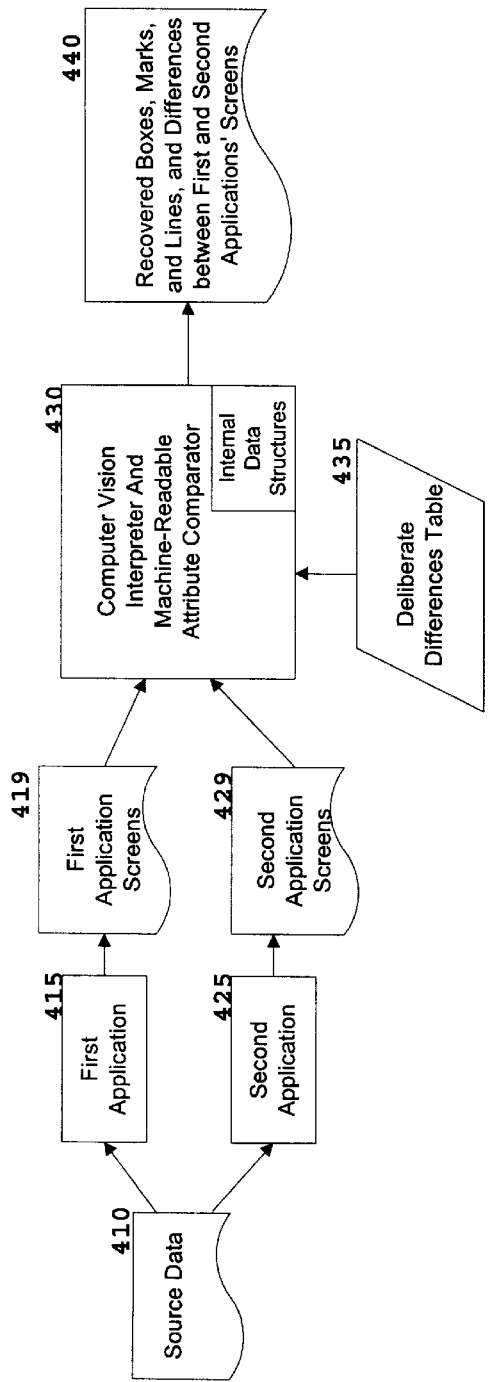
FIG. 4A – DUAL APPLICATION FRAMEWORK
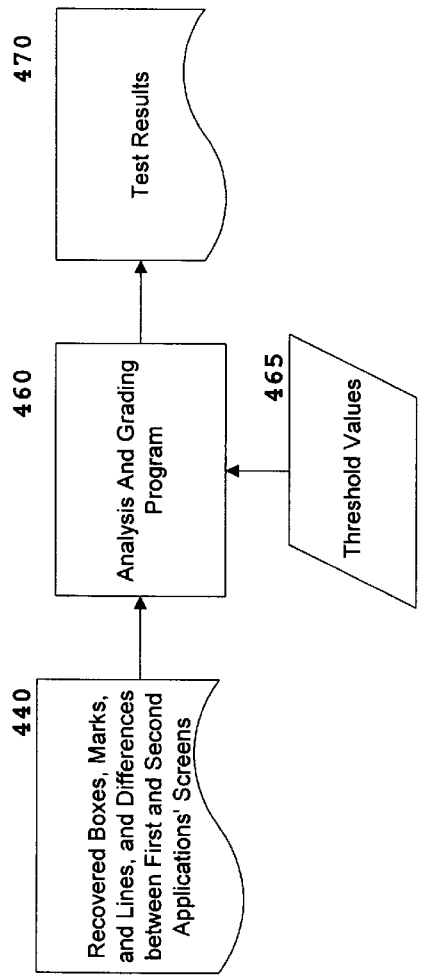
FIG. 4B – GRADING DIFFERENCES

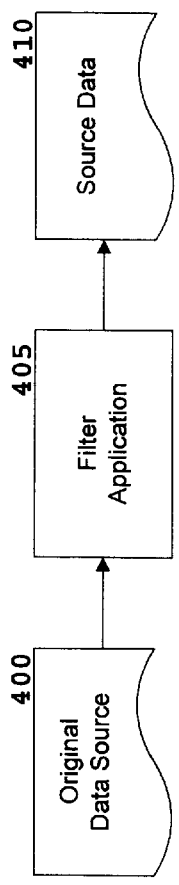
FIG. 4C – FILTERING TO PRODUCE SOURCE DATA
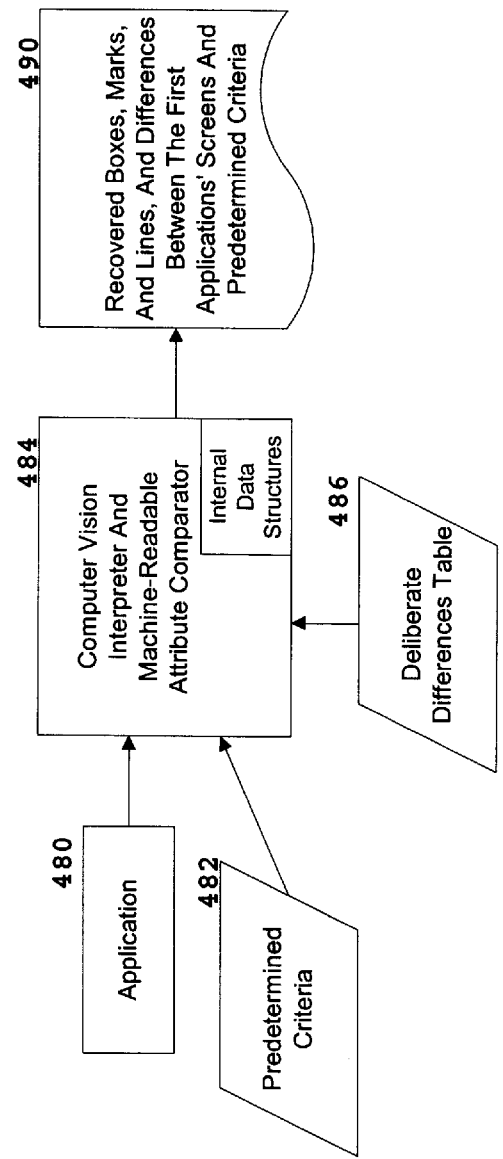
FIG. 4D – SINGLE APPLICATION FRAMEWORK

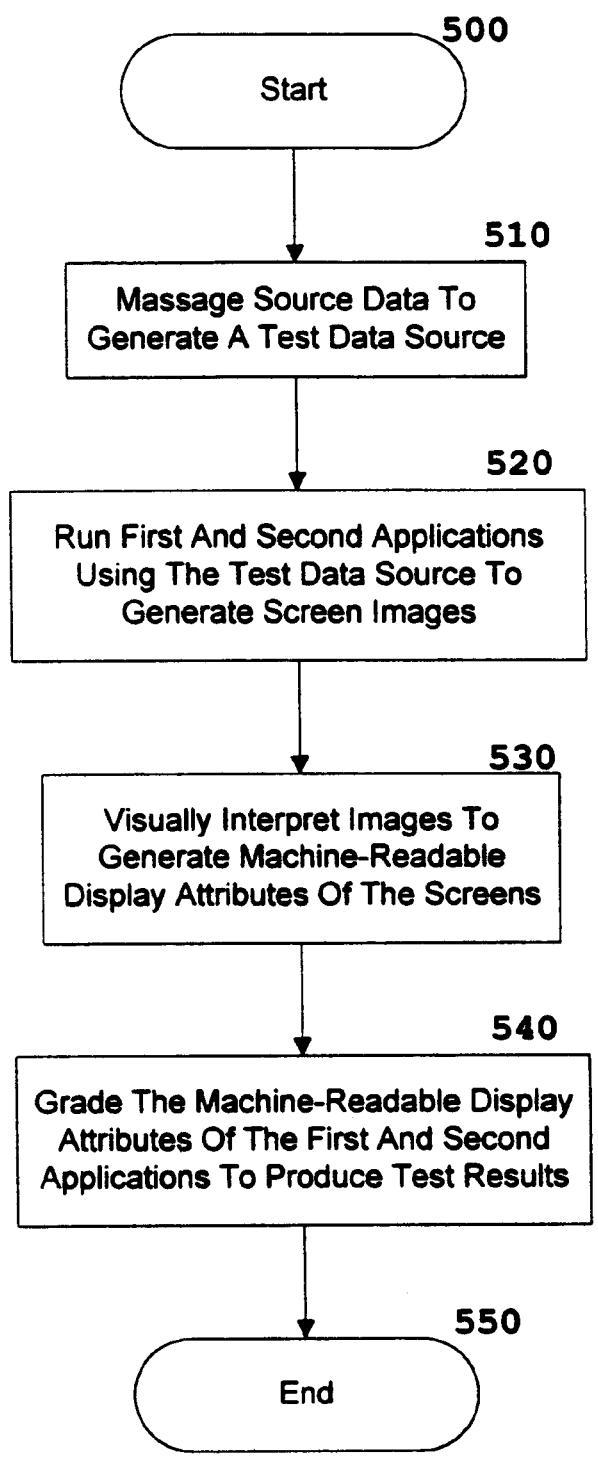
FIG. 5 – COMPARING TWO APPLICATIONS

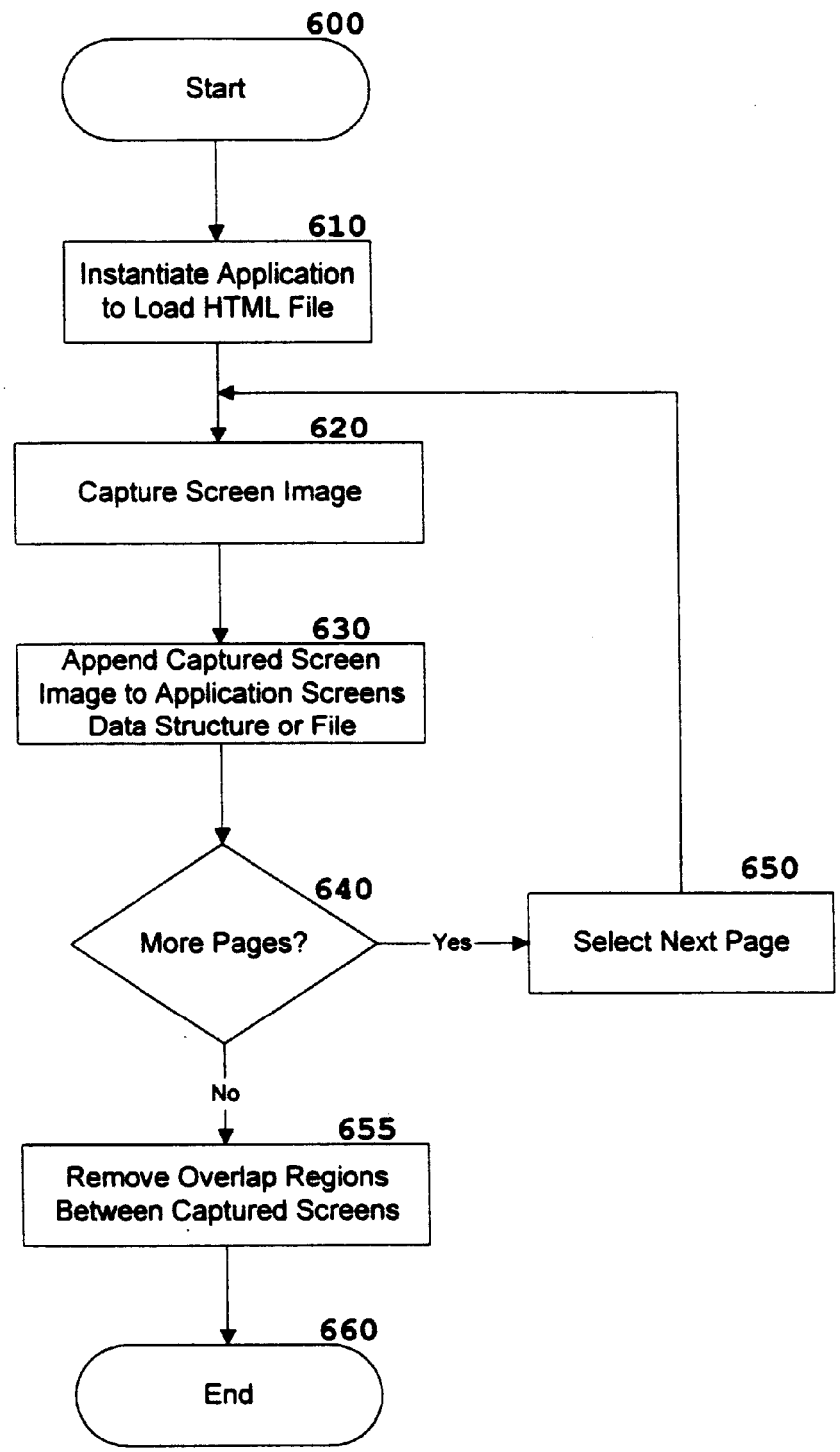
FIG. 6 – GENERATING AND CAPTURING SCREEN IMAGES

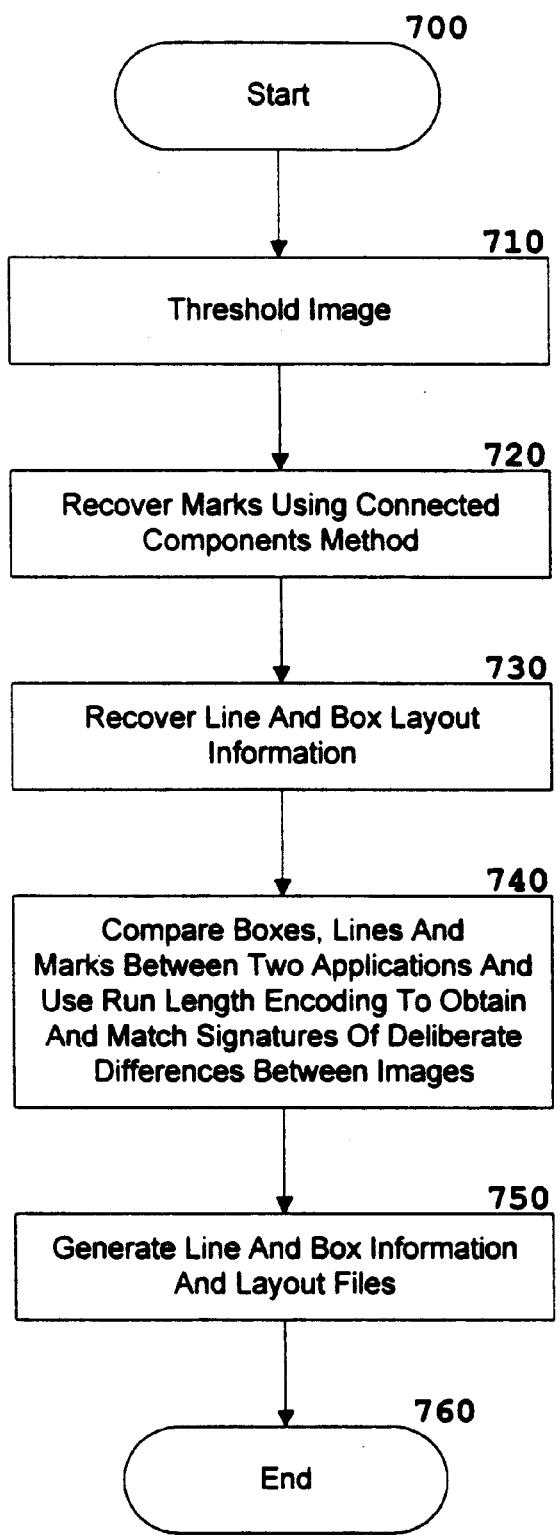
FIG. 7 – GENERATING ATTRIBUTES

810 → `<Boxes> "Bitmap1 Path" "Bitmap1 BoxCount" "Bitmap2 Path" "Bitmap2 BoxCount"`

811 → `<Images> "Bitmap1 Image Count" "Bitmap2 Image Count"`

812 → `<Box "Box Number"> (x1,y1,x2,y2) ("Mark Count", "Line Count") (x1,y1,x2,y2) ("Mark Count", "Line Count") [Differences]`

813 → `<Line "Box Number", "Line Number"> (x1,y1,x2,y2) "Mark Count" (x1,y1,x2,y2) "Mark Count"`

814 → `<Image "Box Number", "Image Number"> (x1,y1,x2,y2) (x1,y1,x2,y2)`

815 → `<Replacements> HR=n Bullet=n Textbox=n Selectbox=n SelectArea=n TextArea=n`

FIG. 8A – LINE AND BOX INFORMATION FILE

```
<1ST Application Box "Box Number">
Parent: blank or "box number"
Left:"list of neighbors"
North:"list of neighbors"
<2ND Application Box "Box Number">
Parent: blank or "box number"
Left:"list of neighbors"
North:"list of neighbors"
<1ST Application Line "Box Number", "Line Number">
Left:"list of neighbors"
North:"list of neighbors"
<2ND Application Line "Box Number", "Line Number">
Left:"list of neighbors"
North:"list of neighbors"
```

FIG. 8B – LAYOUT FILE

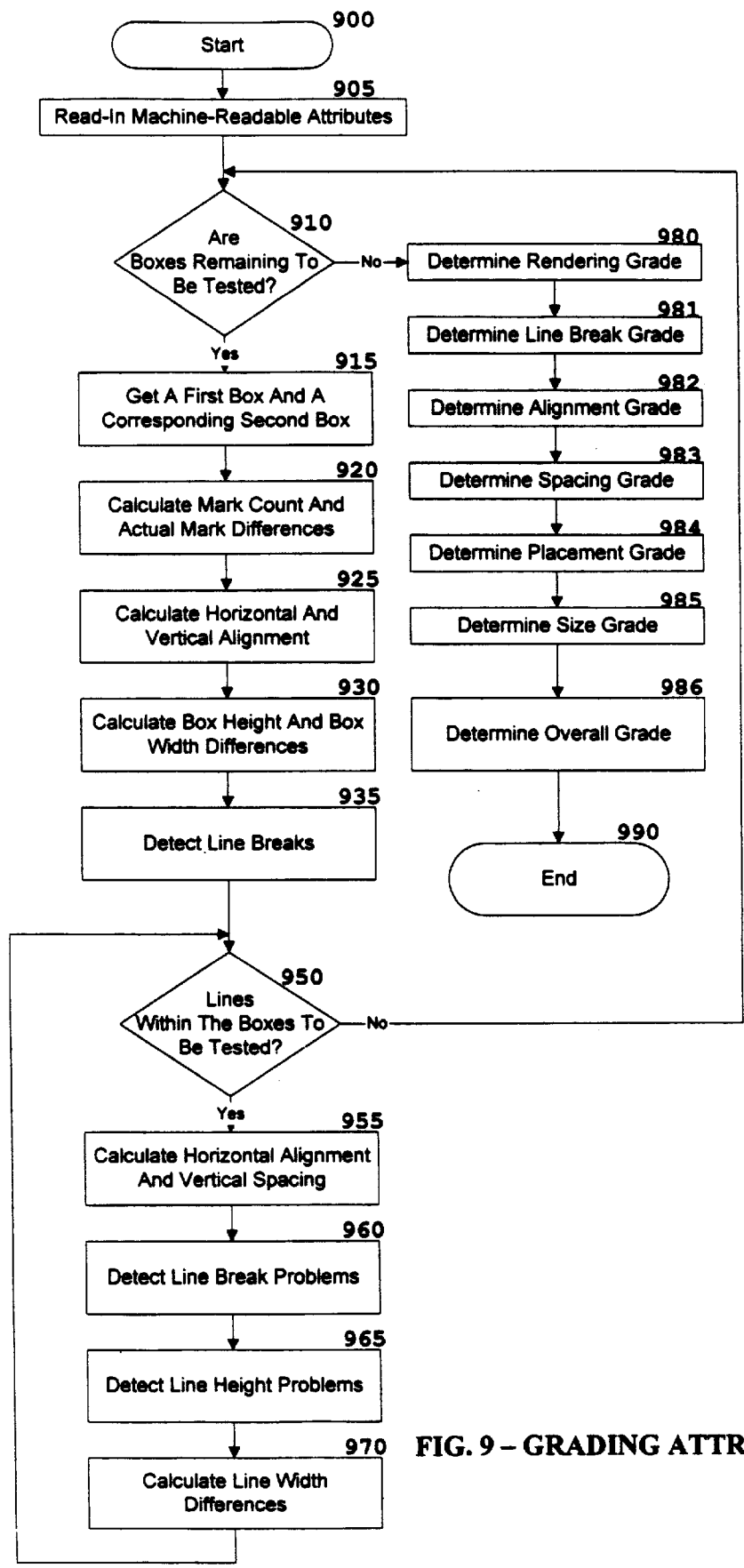
FIG. 9 – GRADING ATTRIBUTES

METHOD AND APPARATUS FOR ANALYZING COMPUTER SCREENS

FIELD OF THE INVENTION

This invention relates to computer programming, and more particularly, to a method and apparatus for analyzing images of rendered computer screens using computer vision including comparing the computer screens rendered by two applications based on a same data source file.

BACKGROUND OF THE INVENTION

Computer users and software developers desire that a document appears the same on a computer display when viewed using two different applications or successive versions of the same application, unless deliberate development decisions were made to implement differences. For example, a document when viewed under Microsoft Word 6.0 should appear the same as a document when viewed under Word 7.0. Moreover, the desire for continuity is exacerbated in the viewing of a Web page using different browsers. The rapid expansion of the Internet and the World Wide Web has enabled businesses and individuals to host their own Web pages. Using Hypertext Markup Language (HTML), Web page authors design creative ways for presenting information and content on their Web pages. Businesses are especially concerned with the appearance of their Web pages, and desire continuity of the presentation of their web pages among commonly available browsers. In other words, Web pages displayed using Microsoft Internet Explorer and Netscape Navigator should appear the same, except for deliberate implementation differences.

This demand has created new challenges for testing organizations as previous testing techniques are inadequate for comparing rendered screens among multiple applications and for analyzing how well information is displayed by an application. Such previous testing approaches include manual verification, bitmap capture and comparison, and verification of display properties.

A first approach for analyzing computer screens is for a human tester to manually inspect screens rendered on one or more computer displays. In one configuration for comparing the screens rendered by two applications, side-by-side displays are used to simultaneously present the screens. The human tester attempts to spot and note differences between the renderings. This type of testing is tedious, time-consuming and subjective, and even the trained eye of an experienced tester will not always detect subtle differences.

A second approach for comparing the rendered screens of two applications is to bitmap capture a sequence of rendered screens from each application, and then to perform a pixel-by-pixel comparison. As this type of testing analyzes at the bit-level without any understanding of the displayed visual attributes (e.g., characters, boxes, lines), the test results provide little more than an indication that the two bitmaps are different.

A semi-automated approach for testing visual attributes of rendered computer screens is to query an application for the display properties of specific elements. For example, to test a color highlighting feature of a text editor, the keyboard commands for setting a word to the color red would be initiated by a testing program. The testing program would then send a query to the application via a testing interface to ask what color the application is displaying the word. However, this testing approach requires additional functionality built into the application for accepting and performing the query. Furthermore, this method does not test what is actually displayed. Rather, it assumes that if the application says a word is displayed as red, it is in fact displayed as red. Therefore, this approach and the prior approaches do not provide for the automated testing of the visual attributes of rendered computer screens.

SUMMARY OF THE INVENTION

According to the invention, an automated method and apparatus are provided for quantitatively analyzing visual attributes recovered from bitmap images using computer vision. In one embodiment of the present invention, these bitmap images correspond to the rendered screens of two applications based on a same data source file. After a series of rendered screens of each application are captured, these bitmap images are interpreted using computer vision techniques to produce machine-readable visual attributes (e.g., boxes, lines and marks) of the rendered screens. Corresponding attributes from each of the two applications are then compared to generate a set of differences. These attributes and differences are then processed to derive a set of grades reflecting the similarities between the rendered screens of the two applications. In another embodiment in keeping with the scope and spirit of the present invention, the rendered screens of a single application are captured and interpreted using computer vision to derive visual attributes of the rendered screens. These visual attributes are then compared to a set of criteria to establish rendering grades of the rendered screens.

When comparing the screens rendered by two applications in accordance with the present invention, each application is preferably executed using the same data source, such as a text or a Hypertext Markup Language (HTML) file. The input to these applications can be an original data source, or the result of preprocessing the original data source to filter non-important information for analyzing purposes (e.g., background colors) and to replace each image with a blank image of the same size and shape. In addition, certain non-visible attributes of a screen (e.g., border-less tables) are modified so they can be easily recognized during the computer vision processing. In this manner, the preprocessing step greatly simplifies the computer vision recognition processing to derive the machine-readable attributes while not losing information important to the quality of the results.

After the optional preprocessing operations, each application is automatically manipulated to render one or more screens, with a bitmap image of each rendered screen captured into a file. These bitmap images are then each visually interpreted to derive visual attributes of the rendered screens, with a data structure populated with corresponding machine-readable attributes.

These visual attributes include marks, boxes and lines. Marks are visual attributes that comprise a set of neighboring foreground (i.e., non-white) picture elements (pixels). A box is a area of an image which encompasses a single large mark whose shape is a union of rectangles or a rectangular area designated by the present invention (e.g., a border-less table). Within each box, lines are a sequence of marks having horizontal rows of white space above and below. In many instances, these lines correspond to lines of text.

Once all the visual elements have been recovered using computer vision for the rendered screens of the two applications, these attributes are compared on a box-by-box basis between the two applications. A resulting data structure is populated describing the visual attributes, their hierarchical and positional relationships, and the differences produced by the two applications. This data structure is then exported to a grading process which analyzes the interpreted elements contained within the data structure.

Because two applications generally render some marks slightly differently, the present invention accommodates a set of deliberate differences, that is, differences between implementations of the applications that should be ignored when comparing attributes. Such differences include, for example, symbols used to denote list elements (e.g., a bullet in one application versus a hyphen in a second application), and spacing between marks. Before comparing attributes, a table of deliberate differences is populated with corresponding differences. These deliberate differences are recognized using some method such as run-length encoding. Within the table, an attribute from the first application screens is run-length encoded and stored with a corresponding run-length encoded version of the second application's attribute. Thus, when comparing two attributes, a signature (i.e., an identifiable pattern) is obtained by matching interpreted attributes with entries in the deliberate differences table. If a match of both attributes is found, then the difference is ignored. In an alternative embodiment, some other computer vision algorithm is used in place of run-length encoding to recognize deliberate differences.

Examples of the comparison tests performed and grades determined by the grading process include checking for differences in character rendering, line breaks, alignment, spacing, placement and size.

A rendering grade is a measure of how marks from one page match exactly to corresponding marks in the other page. Note that most characters correspond to a single mark (the lowercase i and j are clear exceptions). Line height and box count differences between the rendered screens of the two applications affect the rendering grade as well. Low grades in rendering generally signify a font difference between the pages, or marks which exist on one page but are missing on the other.

The line breaks grade denotes the percentage of lines in the two pages which are broken at the same location within each line. Differences in total number of lines within a box adversely affect the line break grade as well. Line breaks occur based upon numerous variables including font size, font shape, spacing and screen widths used. In many instances, a line break corresponds to a sentence that is broken in different places between the two applications.

The alignment grade describes the percentage of lines which have the same horizontal alignment. Alignment is calculated by measuring the difference between a line and its left neighboring attribute, and comparing that distance to the distance between the corresponding line and its left neighboring attribute on the second page.

The spacing grade refers to the distance between a line and its upper or north neighbor within the image. Similar to the alignment grade, the distance is compared to the corresponding line on the opposite page.

The placement grade refers to mark placement within corresponding lines between the images of the rendered screens of the two applications. This corresponds to spaces between characters of words and between words of sentences.

The size grade reflects box height and width differences between the rendered screens between the two applications. Differences in size are commonly caused by differences in table heights and widths within an HTML document.

An overall rendering grade is determined by a weighted average of the aforementioned individual grades. Furthermore, in determining these grades, user-definable threshold values are used so that minor differences discovered in comparing the machine-readable attributes between two different renderings are ignored if they are less than these user-definable levels. These threshold categories in one embodiment of the present invention include alignment, spacing, width, and height variances for both lines and boxes, as well as threshold values for mark count and differences, and for line breaks.

These grades illustrate those produced in one embodiment of the present invention. In keeping with the scope and spirit of the invention, many different types of grades and tests can be performed on the machine-readable attributes recovered from the bitmap image using computer vision. Furthermore, the teachings of the invention disclosed herein are applicable beyond HTML documents and Web browsers to any applications or operating environment rendering screens including word processors, graphical user interfaces, and the like.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIGS. 2A–2C illustrate visual attributes recovered in accordance with the present invention;

FIGS. 2D–2E demonstrate the recovery of marks within a captured bitmap image of a rendered screen;

FIGS. 3A–3F illustrate differences between screens which are identified using the present invention;

FIG. 4A is a data flow diagram of one embodiment of the computer vision testing framework for analyzing the differences between rendered screen images from two different applications;

FIG. 4B is a data flow diagram illustrating the grading of differences;

FIG. 4C is a data flow diagram of an optional pre-processing step of the original data source to simplify the computer vision recognition processing;

FIG. 4D is a data flow diagram of one embodiment of the computer vision framework for testing a single application;

FIG. 5 is a high-level flow diagram describing the steps performed by the computer vision testing application to analyze and grade the rendered screens from two different applications in accordance with one embodiment of the present invention described herein;

FIG. 6 is a flow diagram illustrating the steps for generating and capturing rendered screen images;

FIG. 7 is a high-level flow diagram illustrating the steps for recovering the visual attributes of marks, boxes and lines within a captured bitmap image;

FIGS. 8A–8B illustrate the structure of an intermediate data file containing layout and component information recovered using computer vision; and FIG. 9 is a flow diagram illustrating the grading of differences in accordance with one embodiment of the present invention described herein.

DETAILED DESCRIPTION OF THE PREFERRED EMBODIMENT

Figure 1:
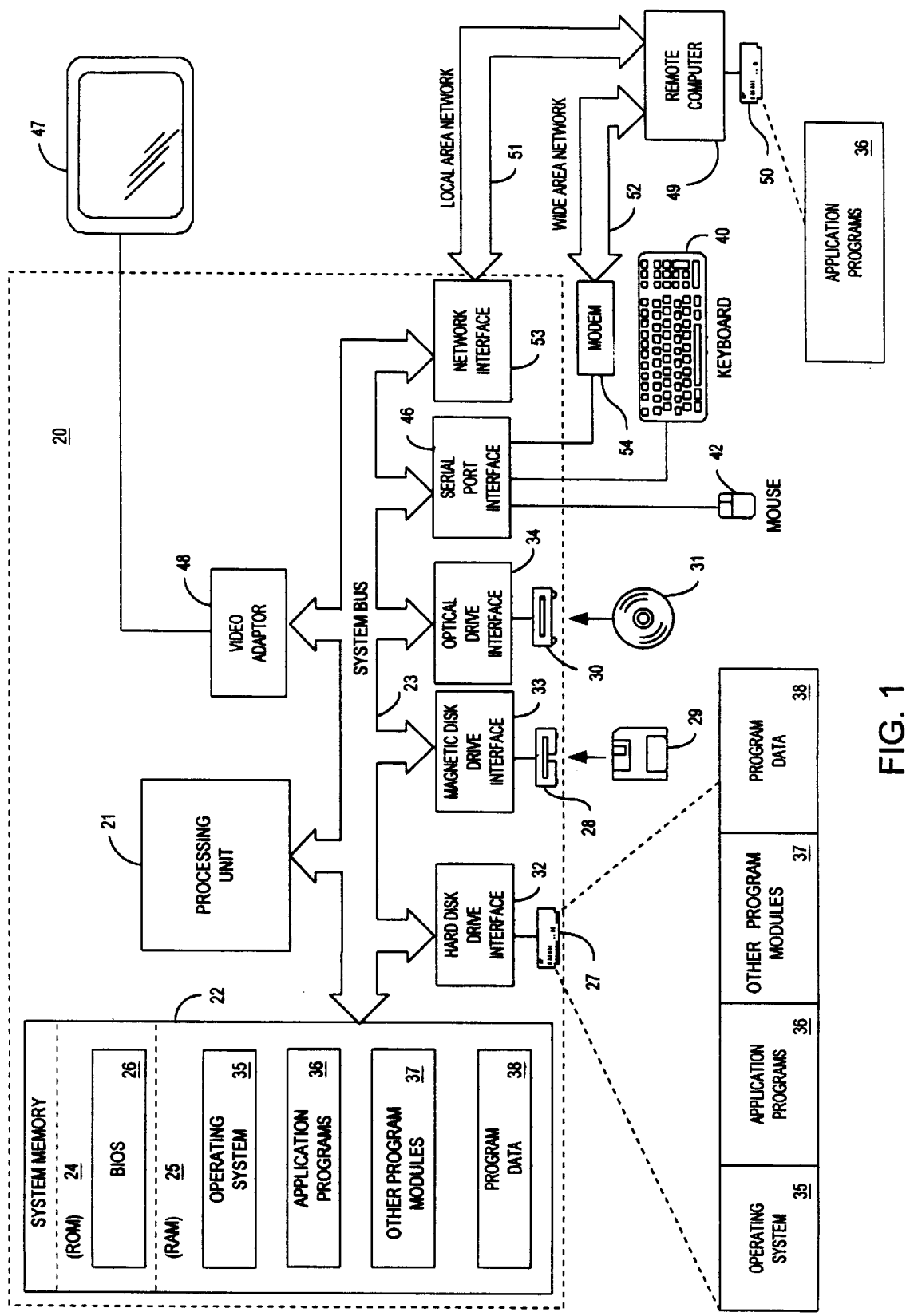
FIG. 1 is a block diagrams of an exemplary operating environment in which the invention may be implemented, including a computer system for interpreting rendered screens, comparing the resultant machine-readable attributes, and grading the differences in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention, commands are stored in system memory 22 and are executed by processing unit 21 for rendering the screens, capturing the bitmap images, interpreting the visual attributes using computer vision, comparing the interpreted machine-readable attributes, and grading their differences. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

According to the present invention, an automated method and apparatus are provided for quantitatively analyzing visual attributes recovered from bitmap images using computer vision. In one embodiment, these bitmap images correspond to the rendered screens of two applications based on a same data source file. An optional preprocessing step filters the data source file to simplify the computer vision techniques. For example, the filtering process may remove non-important information for analyzing purposes such as a colored background, or replace each image with a blank image of the same size, modify non-visible attributes of a screen so their structure can be recovered during the computer vision processing, or all of the above. After a series of rendered screens of each application are captured, these bitmap images are interpreted using computer vision techniques to produce machine-readable visual attributes of the rendered screens. Corresponding attributes from each of the two applications are then compared to generate a set of differences, where those differences within a predefined set of deliberate design differences are ignored. These attributes and differences are then processed to derive a set of grades reflecting the similarities between the rendered screens of the two applications. In determining these grades, a set of user-definable thresholds are used to overlook small variances inherent in the rendering by the different applications.

Turning now to FIGS. 2A–2C, shown are block diagrams illustrating marks, lines, and boxes to be recovered using computer vision techniques from the bitmap captured images of the rendered screens. As illustrated in FIG. 2A, marks (201–208) are contiguous portions of an image. Most individual characters are a single mark, while certain characters such as an 'i' comprise multiple marks 203, 206. In terms of a bitmap image, marks are a set of neighboring pixels that are part of the foreground. In one embodiment, foreground pixels are currently non-white pixels. Referring now to FIG. 2B, lines are a group of marks within a box that are separated from other lines or marks with vertical white space. In other words, lines are a horizontal sequence of marks, which often correspond to rows of text. For instance, shown in FIG. 2B are three lines 211–213. A box is defined as any large glyph on the screen consisting of a union of rectangles. For instance, HTML tables form boxes. In addition, the screen itself is considered a box. As illustrated in FIG. 2C, each table cell is a box (221–228), as is the entire table 220 itself.

To recover the visual attributes of marks, lines and boxes within a bitmap image, such as from bitmap 230 shown in FIG. 2D, the bitmap is analyzed to identify and group neighboring sets of non-white pixels which have the same value. For example, bitmap 230 is composed of a series of ones and zeros, where the zeros comprise the image background 231. Represented within bitmap 230 are two marks 232 and 233. For illustrative purposes, these marks 232, 233 have been made bold in FIG. 2E, and are outlined by polygons 244 and 246. Thus, two marks 232, 233 can be recovered from the bitmap 230.

In comparing the rendering of a screen by one application to the rendering of the same screen by another application, or possibly against some predetermined criteria, various levels of testing can be performed on the rendered images. These tests include checking the differences in the rendering of marks, line breaks, text alignment, vertical spacing, horizontal spacing, placement of characters and words on a screen, and sizes of tables and boxes. The differences checked for by these various tests are illustrated in FIGS. 3A–3F, and described herein. As would be evident to one skilled in the art, the described tests comprise only a subset of the possible tests that could be performed in accordance with the present invention.

Shown in FIG. 3A is the character 'A' rendered using two different fonts. Although substantively an 'A' appears on each screen 301, 306, the rendering of the 'A' 300 and 'A' 305 are different.

Line breaks occur, for instance, when a line of text exceeds the width of a page. Depending on various characteristics of the characters as drawn on the screen, a line can break at different places between different renderings. As shown in FIG. 3B, the line breaks 310, 315 appear at different positions in the sentences.

Alignment refers to the horizontal position of text relative to some location. For instance, in FIG. 3C, text 320 is left justified in box 322, whereas text 326 is right justified in box 324.

Vertical spacing differences also occur between two images. For instance, the vertical spacing 330 between lines of text 332, 334 is different than the vertical spacing 335 between lines of text 337 and 339 as illustrated in FIG. 3D. Similarly, horizontal spacing 340 is different than horizontal spacing 345 between words as illustrated in FIG. 3E.

Finally, the size of cells within tables can vary among different screen renderings. For instance, the right border 352 (FIG. 3F) of table 350 is different in position than the right border 357 of table 355.

Referring now to FIG. 4A, shown is a data flow diagram of a framework for testing and analyzing the screens rendered by two different applications from a single source data file in accordance with one embodiment of the present invention. As illustrated, a first application 415 and a second application 425 use the same source data file 410 as their input. For each application 415, 425, the resulting screen images from each application 415, 425 are captured to produce a first application screens file 419 and a second application screens file 429. These captured screen files 419, 429 are then used as input to a computer vision interpreter and machine-readable attribute comparator process 430. This process 430 consults a deliberate differences table 435 and produces as its output a file 440 containing recovered boxes, marks and lines as well as differences between corresponding attributes between the first and second application screens files 419, 429.

As illustrated in FIG. 4B, the output file 440 is used as input to an analysis and grading program 460 to produce and display a test results file 470. The grading program 460 uses a set of threshold values 465 to analyze the differences and to determine an overall grade, as well as rendering, line break, alignment, spacing, placement and size grades. The threshold values 465 are adjustable by a user to provide flexibility and to overcome inherent unimportant differences between rendered screens of different applications, and can be set on an overall or per document or image basis.

Moreover, a user interface is provided to allow users to visually see the differences detected by the present invention. In one embodiment, colors clues are displayed along with the original document(s). For example, line break differences are indicated by yellow underlining, and sized differences are highlighted with red rectangles. In this manner, a user can visually see the differences while adjusting the user-definable threshold values 465. Thus, the user can easily and readily perform failure analysis in which the user-definable threshold values 465 are adjusted in order to investigate the source(s) of the differences determined by the present invention, or to increase the overall grade.

FIG. 4C illustrates an optional preprocessing step in which a filter application 405 massages an original data source 400 to produce the source data file 410. The source data file 410 is then used as input to the applications 415, 425 as illustrated in FIG. 4B and described herein. The modifications to the original data source 410 are performed to remove extraneous information while keeping the original layout specified by the original data source 400 in tact. This massaging is described in greater detail hereinafter in relation to optional preprocessing step 510 of FIG. 5.

The architecture presented in FIGS. 4A–4C is just one embodiment of many possible embodiments of the present invention. For example, as would be evident to one skilled in the art, separate computer vision and grading processes 430, 460 are not required by the present invention. Additionally, another embodiment in accordance with the present invention is illustrated in FIG. 4D. The operation of this embodiment (including the computer vision interpreter and machine-readable attribute comparator 484 and the deliberate differences table 486) is synonymous with the operation of the embodiment illustrated in FIG. 4A and described herein, with one exception. The interpreted machine-readable attributes of the rendered screens of an application 480 are compared against a set of predetermined criteria 482, rather than the interpreted machine-readable attributes of the rendered screens of a second application.

Turning now to FIG. 5, presented is a high-level flow diagram illustrating the steps comparing two applications for an embodiment of the present invention disclosed herein and illustrated in FIGS. 4A–4C. Depending on the embodiment of the present invention being employed, processing begins either with optional preprocessing step 510 (also illustrated in FIG. 4C) in one embodiment of the present invention where the original source data 400 is massaged to generate the source data file 410. Alternatively, optional preprocessing step 510 is skipped and processing begins directly with step 520.

Optional preprocessing step 510 filters the original data source 400. These modifications are designed to keep the original layout of the document intact, while making processing easier for the visual recognition process 430 (FIG. 4A). Thus, the sophistication and complexity of the visual recognition process 430 varies depending on the amount and type of filtering performed. In one embodiment of the present invention, three classes of modifications are performed. First, background and pictures are nullified (i.e., replaced with blank images of the same size) to make it easier to detect marks correctly using a connected components method described hereinafter. Second, different shades of color are applied to table cells from border-less tables to make it easier to detect groups of lines. Third, color is eliminated (except for the color induced in this optional preprocessing step 510). In another embodiment of the present invention, color and uniform background colors are not filtered out, and images are replaced with filled rectangles with different shades of color.

Next, in step 520 the first and second applications 415 and 425 are executed to generate the first and second screens 419 and 429, respectively. The processing of step 520 is further illustrated in the flow diagram of FIG. 6 for processing HTML files. For each of the first and second applications 415, 425, the steps described in relation to FIG. 6 are performed.

First, in step 610, the application (415 or 425) is instantiated to load the HTML file. Next, in step 620 the screen image is captured and appended to the appropriate applications screens file (419 or 429) in step 630. If there is at least one more page to capture as determined in step 640, then the next page is selected using at least one page down command in step 650, and processing continues. When there is not a page left to capture as determined in step 640, any overlapping regions between the captured screens are removed from the generated first or second screens file (419 or 429) as indicated in step 655. The overlapping regions can be determined using a plurality of available methods, such as a pixel-by-pixel comparison. In one embodiment, the determination of the overlapping regions is expedited by determining the number of non-white bits per line, and then comparing these values to determine lines that are possibly within the overlapped region and to exclude those which are not.

After the first and second application screens 419, 429 have been acquired, returning to FIG. 5, step 530 is performed to visually interpret the images to generate machine-readable display attributes of the screen. The processing of step 530 is further illustrated in the flow diagram of FIG. 7. In step 710, the present invention thresholds the captured screen image files to produce new image files where each pixel is now represented by a single bit. In a typical computer, screen images can be captured at various bits per pixel (e.g., 8, 16 or 24 bits). To simplify the visual detection processing, the bitmap is converted to a single bit image whereby any non-zero pixel is set to one.

Next, in step 720, marks are recovered using a connected components method. A variety of connected components and similar methods are available for recovering characters which could be used in various embodiments of the present invention. In one embodiment, characters are recovered by examining all eight neighboring pixels (two horizontal, two vertical, and four diagonal). A modified 4-connected component pass is used with additional merges to handle the diagonal neighboring pixels.

Connected components can be computed in a single pass of a bitmap image by examining four pixels at a time for each pixel location (x,y) within the bitmap image. A connected components array is created having the same number of elements as the original bitmap, with a different value or "label" assigned to each mark. Each pixel within a single mark, and only those pixels within a given mark, will have one given label. The source bitmap is traversed in a row major fashion such that its upper and left neighbors have already been processed.

The label for a pixel (x,y) is determined by examining the adjacent pixels which have been previously labeled. These labels are assigned as follows.

1. If (x,y) is zero, the label is 0.

2. If (x,y) is non-zero and both of (x−1,y),(x,y−1) are zero, then (x,y) gets a new label.

3. If (x,y) is non-zero and exactly one of (x−1,y),(x,y−1) are zero, then (x,y) gets the label of that non-zero pixel.

4. If (x,y) is non-zero, and both of (x−1,y),(x,y−1) are non-zero and have the same label, then (x,y) gets that label.

5. If (x,y) is non-zero, and both of (x−1,y),(x,y−1) are non-zero and have different labels, then (x,y) gets either of the two labels (it doesn't matter which one), and an entry is added to a table of merges to be performed.

6. If a diagonal neighbor (x−1,y−1) or (x+1,y−1) has a different label than the one assigned to (x,y) in steps 1–5, an entry or entries are added to the table of merges to merge with (x,y)'s new label.

After each pixel has been processed, the connected components array contains a set of marked marks, as well as partial marks with corresponding entries in the table of merges. Performing this merge can be viewed as a graph problem, where the nodes of the graph represent partial marks, and there is an edge between two partial marks that must be merged. A standard graph algorithm for path compression (such as union-find) is used to merge the marks. Once these merges have been performed, then each of the marks within the bitmap images has been identified.

Next in step 730, lines and boxes are recovered from the array of connected components identifying the marks. As previously mentioned, the entire captured screen and each mark are boxes, as are items designated as such in the optional preprocessing step 510 (FIG. 5) such as border-less tables. Within each box, lines are detected as they are distinguished as having horizontal rows of pixels having a value of zero above and below each line. To simplify this horizontal projection operation, a one dimensional array is created having an entry for each row of pixels within each box, with its value being the number of zero pixels on that row. This is an iterative process resulting in a data structure for each interpreted bitmap image which is populated to reflect the hierarchy of detected boxes, lines and marks.

These two hierarchies of detected boxes, lines and marks are then compared against each other in step 740 to determine variations between the screens 419, 429 (FIG. 4A) rendered by the first application 415 and second application 425. This comparison is accomplished by comparing the machine-readable attributes of corresponding boxes between the screens 419, 429 and their mark(s) and possibly one or more lines contained within each box.

In comparing these boxes, detected differences corresponding to entries in a table of deliberate differences are ignored. This feature of the present invention allows rendering differences caused by certain design choices to be ignored so that the end test results better reflect variations caused by unknown differences. For example, bullet list indicators might be rendered as a dot in the first application a 415 while rendered as an asterisk by the second application 425. If these rendering differences are not ignored, the test results will be skewed. For each deliberate difference, two entries are stored in the table of differences. The first is a run-length encoded version of the item as would appear in the first application 415, and the second being a run-length encoded version of the item as it would appear in the second application 425. In this fashion, deliberate differences are readily detected by matching table entries against discovered differences.

Next, in step 750, the contents of the internal data structures of the computer vision interpreter and machine-readable attribute comparator process 430 (FIG. 4A) are output to files in one embodiment of the present invention. The first of these files contains the detected box, line and mark information, and the syntax of this file is illustrated in FIG. 8A and described hereinafter. Entry 810 contains the filename for the first application screens 419 (FIG. 4A), a count of the number of boxes within the first application image screens 419 as determined in step 530 (FIG. 5), the filename for the second application screens 429 (FIG. 4A), followed by a count of the number of boxes within the second application image screens 429 as determined in step 530 (FIG. 5). Entry 811 contains a count of the images that have been modified in the optional preprocessing step 510. Next, a set of entries 812 describe each corresponding pair of identified boxes between the rendered screens of the two applications 415, 425. Entry 812 contains a unique number identifying the box pair, and for each of the two boxes, the pixel coordinates of the upper-left and lower-right corners of the box and the number of marks and lines contained within each box, followed by a count of the number of differences determined in step 740 (FIG. 7). Next, a set of entries 813 describe each corresponding pair of identified lines between the rendered screens of the two applications. Entry 813 contains the unique box identifying number for the boxes in which the lines are contained, a unique number identifying the line pair, and for each of the two lines, the pixel coordinates of the upper-left and lower-right corners of the line and the number of marks contained within each line. Next, a set of entries 814 describe each corresponding pair of images between the rendered screens of the two applications. Entry 814 contains the unique box identifying number for the boxes in which the images are contained, a unique number identifying the image pair, and for each of the two images, the pixel coordinates of the upper-left and lower-right corners of the image. Finally, a set of entries 815 describe replacements made during the optional preprocessing step 510 (FIG. 5).

The second of these files contains layout information describing the hierarchy of the machine-readable attributes recognized using computer vision in step 530 (FIG. 5) of the captured rendered screens 419, 429 (FIG. 4A). The syntax of the layout file is illustrated in FIG. 8B. For each box detected within the rendered screens of the first and second applications, its parent box (null for a box corresponding to a full screen), the neighboring boxes to the left and above ("north") are listed. Similarly, for each line detected, the box number in which it lies as well as its left and north neighbors are listed.

The attributes and hierarchical relationships contained in the line and box information and layout files 440 (FIG. 4) are then used by the analysis and grading program 460 (FIG. 4B) to determine a set of grades describing the similarities between machine-readable attributes in step 540 (FIG. 5). The processing of step 540 is detailed in the flow diagram of FIG. 9, in which processing begins with step 905.

In step 905, a data structure within the grading program is populated with the information contained in the recovered attributes and hierarchy files 440 (FIG. 4), the syntax of these files 440 are illustrated in FIGS. 8A–B and described above. These data structure elements are then manipulated in the remaining steps depicted in FIG. 9 and described hereinafter. While there are boxes remaining to be tested as determined in step 910, a pair of corresponding boxes is retrieved in step 915. The machine-readable attributes of the boxes with their respective lines and marks are manipulated in steps 920–935 to determine various attribute properties and differences including mark counts and actual mark differences (step 920), horizontal and vertical alignments (step 925), box height and width differences (step 930) and line breaks (935). Then, for each of the lines within the retrieved boxes (step 950), the machine-readable attributes of the lines are manipulated in steps 955–970 to calculate the horizontal alignment and vertical spacing (step 955), detect line break problems (step 960), detect line height problems (step 965), and line width differences (step 970). Known differences exist between rendered screen images of two applications even when using the same source file. Therefore, in performing in comparing the machine-readable attributes between two different renderings, differences are ignored if they are less than some user-definable threshold values 465 (FIG. 4B). These threshold categories include alignment, spacing, width, and height variances for both lines and boxes, as well as threshold values for mark counts, mark differences, and for line breaks.

After all the boxes and lines have been processed by the analysis and grading program 460 (FIG. 4B), the actual individual grades of rendering, line break, alignment, spacing, placement, and size are determined and output in steps 980–985, as well as an overall similarity grade in step 986. In addition, a count of differences between the images is used to produce a deviation grade. The rendering grade, as determined in step 980, is based on the mark count, actual mark differences, box height, and box counts. The line break grade, determined in step 981, denotes the percentage of lines which break at the same location. The alignment grade, determined in step 982, denotes the percentage of lines which have the same horizontal alignment, where the alignment is measured from a given line's left neighbor. The spacing grade, determined in step 983, denotes the percentage of lines which have the same spacing from their respective north neighbors. The placement grade, determined in step 984, measures character placement within corresponding lines within documents. The size grade, determined in step 985, indicates the percentage of box height and width differences between the two rendered screens. Finally, in step 986, a composite or overall grade is determined by averaging the individual grades determined in steps 980–985.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a computer system, a method for determining differences between first and second screen images generated by different computer applications, the method comprising the steps of:

capturing imaging data into a first image file for the fist screen image, where the imaging data has been generated by a first computer application for rendering the first screen image from machine-readable source data;

capturing imaging data into a second image file for the second screen image, where the imaging data has been generated by a second computer application, that is different from the first computer application, for rendering the second screen image from the same machine-readable source data that generated the imaging data for the first screen image;

automatically comparing the imaging data in the first and second image files; and generating from the comparison of the image files a data structure containing visual differences between the first and second screen images.

2. The method of claim 1, wherein the imaging data generated by first and second computer applications includes marks, lines and boxes.

3. The method of claim 1, further comprising the step of massaging a data source to generate the machine-readable source data.

4. The method of claim 3, wherein the data source is a HTML file.

5. The method of claim 3, wherein the step of massaging the data source includes modifying a background image or a picture associated with the data source.

6. The method of claim 1, wherein the first and second screen images include concatenated bitmap captured screen images; the step of generating imaging data for the first screen image includes running the first computer application; and the step of generating imaging data for the second screen image includes running the second computer application.

7. The method of claim 1, wherein generating the data structure containing visual differences between the first and second screen images, further comprises referencing a set of deliberate differences.

8. The method of claim 7, wherein one or more elements of the set of deliberate differences are run-length encoded.

9. The method of claim 1, further comprising the step of grading the visual differences between the first and second screen images.

10. The method of claim 9, wherein the step of grading references a set of threshold values for determining whether or not to recognize a particular difference between the first and second screen images.

11. The method of claim 1, further comprising the step of visually displaying the data structure containing visual differences between the first and second screen images.

12. The method of claim 11, wherein the step of generating the data structure containing visual differences between the first and second screen image references a set of threshold values for determining whether or not to recognize a particular difference between the first and second screen images; and the method further comprising the step of modifying one or more threshold values within the set of threshold values in response to user input.

13. A computer-readable medium having computer-executable instructions for performing the steps recited in claim 1.

14. In a computer system, an automated method for detecting differences between first and second screen images produced by different versions of a computer application, the method comprising the steps of:

interpreting the first screen image to generate a first set of machine-readable attributes describing visual attributes of the first screen image;

interpreting the second screen image to generate a second set of machine-readable attributes describing visual attributes of the second screen image; and automatically processing the first and second sets of machine-readable attributes to provide a comparison between the first and second screen images.

15. In a computer system, a method for comparing first and second digital images respectively corresponding to first and second outputs of first and second different computer applications, the method comprising the steps of:

populating a first data structure with a set of machine-readable attributes describing the first digital image by determining related picture elements (pixels) comprising components of the first digital image;

populating a second data structure with a set of machine-readable attributes describing the second digital image by determining related pixels comprising components of the second digital image; and analyzing the machine-readable attributes represented in the first and second data structures to automatically generate a comparison of the first and second digital images.

16. A computer-readable medium having computer-executable instructions for performing the steps recited in claim 15.

17. The method of claim 15, wherein the step of analyzing the machine-readable attributes further comprises referencing a set of deliberate differences.

18. The method of claim 17, wherein one or more elements of the set of deliberate differences are run-length encoded.

19. The method of claim 15, wherein the steps of populating the first and second data structures include executing a connected points means.

20. The method of claim 15, wherein the first and second computer applications use the same source data in producing the first and second outputs.

21. The method of claim 15, wherein the machine-readable attributes include marks, lines and boxes.

22. The method of claim 15, wherein the comparison includes a rendering grade indicating how many marks from the first data structure are similar or identical to marks from the second data structure.

23. The method of claim 15, wherein the comparison includes a line break grade indicating the number of lines from the first data structure having the same number of glyphs as corresponding lines from the second data structure.

24. The method of claim 15, wherein the comparison includes an alignment grade indicating the number of lines from the first data structure having the same horizontal alignment as corresponding lines from the second data structure.

25. The method of claim 15, wherein the comparison includes a spacing grade indicating the number of lines from the first data structure having the same line spacing as corresponding lines from the second data structure.

26. The method of claim 15, wherein the comparison includes a placement grade indicating the similarity of character placement within corresponding lines in the first and second data structures.

27. The method of claim 15, wherein the comparison includes a size grade indicating the similarity in the size of a box in the first data structure with a box in the second data structure.

28. The method of claim 15, wherein the analyzing of the machine-readable attributes includes referencing a set of predetermined threshold values for determining whether or not to recognize a particular difference between the first and second digital images.

29. The method of claim 28, wherein the predetermined threshold values are set on a per digital image basis.

30. A computer-readable medium having instructions for determining differences between first and second screen images generated by first and second computer applications respectively, the instructions performing the steps of:

capturing imaging data into a first image file for the first screen image, where the imaging data has been generated by a first computer application for rendering the first screen image from machine-readable source data;

capturing imaging data into a second image file for the second screen image, where the imaging data has been generated by a second computer application, that is different from the first computer application, for rendering the second screen image from the same machine-readable source data that generated the imaging data for the first screen image;

automatically comparing the imaging data in the first and second image files; and generating from the comparison of the image files a data structure containing visual differences between the first and second screen images.

31. The method of claim 30, further comprising the step of grading the visual differences between the first and second screen images.

* * * * *

UNITED STATES PATENT AND TRADEMARK OFFICE
CERTIFICATE OF CORRECTION

PATENT NO.   : 6,226,407 B1
DATED        : May 1, 2001
INVENTOR(S)  : Zabih et al.

It is certified that error appears in the above-identified patent and that said Letters Patent is hereby corrected as shown below:

Column 3,
Line 35, "one. Page" should read -- one page --.

Claim 1,
Line 5, "fist" should read -- first --.

Signed and Sealed this

Twelfth Day of March, 2002

Attest:

JAMES E. ROGAN
Attesting Officer    Director of the United States Patent and Trademark Office